2,763,654
Patented Sept. 18, 1956

2,763,654

METHYL RESERPATE O-ACETOACETATE

Jacob Szmuszkovicz, Portage Township, Kalamazoo County, Mich., assignor to The Upjohn Company, Kalamazoo, Mich., a corporation of Michigan No Drawing. Application March 31, 1955,
Serial No. 498,420

1 Claim. (Cl. 260—287)

The present invention is concerned with physiologically active chemical compounds related to reserpine and is more particularly concerned with methyl reserpate O-acetoacetate represented by the following formula, the acetoacetate radical being underlined:

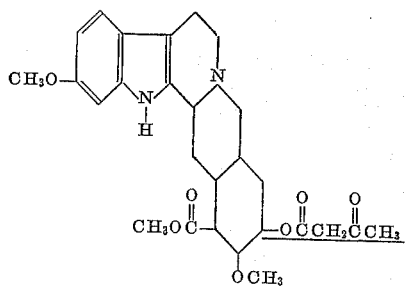

It is an object of the present invention to provide methyl reserpate O-acetoacetate which is a physiologically active agent of high potency having hypotensive and sedative properties and which has a superior ratio of hypotensive to sedative activity and a superior therapeutic ratio when compared with reserpine. The compound of the present invention can be substituted for reserpine in known reserpine-containing pharmaceutical compositions such as tablets, injectables, and elixirs. Other objects and uses of the present invention will be apparent to one skilled in the art.

The methyl reserpate O-acetoacetate of the present invention is obtained by esterification of methyl reserpate to introduce the acetoacetate radical, as more fully illustrated by the example below. The starting methyl reserpate is prepared by methanolysis of reserpine with sodium methoxide according to the procedure of Dorfmann et al. recorded in Helv. Chim. Acta, 37, 59 (1954). Within the meaning of the term "methyl reserpate O-acetoacetate" and the scope of this invention is included the free base, acid addition salts such as the sulfates, hydrochloride, phosphates, hydrobromide, acetate, propionate, benzoate, maleates, succinates, phenylacetate, β-cyclopentylpropionate, etc., and quaternary ammonium salts obtained by reaction of the free base with organic halides such as methyl iodide, ethyl bromide, benzyl chloride, etc.

The following example is illustrative only and is not to be construed as limiting the scope of the present invention.

Example

One gram of methyl reserpate and fifty milliliters of methyl acetoacetate were heated on a steam-bath for four hours with exclusion of atmospheric moisture by a drying tube, the methyl alcohol being distilled as formed in the reaction mixture. The resulting brown solution was concentrated to dryness in vacuo. The residue was boiled with methanol, cooled, filtered, washed with methanol until colorless, and dried in vacuo; yield 1.05 grams or 87.5% of the theoretical amount; melting point 236–239.5 degrees centigrade with decomposition. Further recrystallization from a small volume of chloroform gave colorless prisms of methyl reserpate O-acetoacetate: melting point 238–240 degrees centigrade with decomposition.

Analysis.—Calculated for $C_{27}H_{34}N_2O_7$: C, 65.04; H, 6.87; N, 5.62. Found C, 64.63; H, 7.16; N, 5.56.

I claim:

Methyl reserpate O-acetoacetate.

No references cited.